(12) United States Patent
Long

(10) Patent No.: US 11,143,320 B2
(45) Date of Patent: Oct. 12, 2021

(54) WATER PATH CONTROL VALVE STRUCTURE FOR FLUSHING TOILET LID

(71) Applicant: XIAMEN R&J PRECISION TECHNOLOGY CO., LTD, Fujian (CN)

(72) Inventor: Xi Long, Fujian (CN)

(*) Notice: Subject to any disclaimer, the term of this patent is extended or adjusted under 35 U.S.C. 154(b) by 0 days.

(21) Appl. No.: 16/960,878

(22) PCT Filed: Apr. 9, 2019

(86) PCT No.: PCT/CN2019/081862
§ 371 (c)(1),
(2) Date: Jul. 8, 2020

(87) PCT Pub. No.: WO2019/201110
PCT Pub. Date: Oct. 24, 2019

(65) Prior Publication Data
US 2021/0080017 A1   Mar. 18, 2021

(30) Foreign Application Priority Data
Apr. 19, 2018 (CN) .......................... 201810351765.8

(51) Int. Cl.
*F16K 11/16* (2006.01)
(52) U.S. Cl.
CPC .......... *F16K 11/163* (2013.01); *F16K 11/165* (2013.01); *F16K 11/166* (2013.01);
(Continued)

(58) Field of Classification Search
CPC .... F16K 11/163; F16K 11/165; F16K 11/166; F16K 11/14; Y10T 137/87161;
(Continued)

(56) References Cited

U.S. PATENT DOCUMENTS 6,240,941 B1* 6/2001 Small ................... F16K 27/003
137/1
8,267,117 B2* 9/2012 Waymire ............ F16K 11/0856
137/595
(Continued)

FOREIGN PATENT DOCUMENTS

CN   203248780 U   10/2013
CN   104099984 A   10/2014
(Continued)

OTHER PUBLICATIONS

International search report of PCT/CN2019/081862.

*Primary Examiner* — Atif H Chaudry

(57) ABSTRACT

A water path control valve structure for flushing the toilet lid, which is divided into upper and lower valve parts, including a valve body, a linkage valve core and a sealing component. The sealing component is installed on the linkage valve core, and the linkage valve core is arranged in the hollow valve body and one end of the linkage valve core extends out of the valve body. The linkage valve core includes an upper valve core and a lower valve core arranged coaxially, and one end of the upper valve core extends out of the valve body. The upper and lower valve cores are respectively installed with the sealing member.

12 Claims, 16 Drawing Sheets

(52) U.S. Cl.
CPC ... *E03C 2201/30* (2013.01); *Y10T 137/87129* (2015.04); *Y10T 137/87145* (2015.04); *Y10T 137/87161* (2015.04)

(58) Field of Classification Search
CPC ..... Y10T 137/87129; Y10T 137/87145; E03C 2201/30
See application file for complete search history.

(56) References Cited

U.S. PATENT DOCUMENTS

| | | | | |
|---|---|---|---|---|
| 2011/0017325 | A1* | 1/2011 | Hoshi | G01F 1/36 137/595 |
| 2015/0027575 | A1* | 1/2015 | Morein | F01P 7/14 137/865 |
| 2016/0281585 | A1* | 9/2016 | Muizelaar | F16K 31/042 |

FOREIGN PATENT DOCUMENTS

| | | | |
|---|---|---|---|
| CN | 106049637 | A | 10/2016 |
| CN | 108468832 | A | 8/2018 |
| CN | 208221667 | U | 12/2018 |
| JP | 2018044663 | A | 3/2018 |
| KR | 20090079452 | A | 10/2009 |

\* cited by examiner

WATER PATH CONTROL VALVE STRUCTURE FOR FLUSHING TOILET LID

CROSS REFERENCE TO RELATED DISCLOSURE

This application is a U.S. National Phase Application of International Patent Application No. PCT/CN2019/081862, filed on Apr. 9, 2019, which claims priority benefit of Chinese Patent Application No. 201810351765.8, filed on Apr. 19, 2018, and the entire contents of which are incorporated herein by reference.

TECHNICAL FIELD

The present disclosure relates to the field of intelligent toilet lid, in particular to a water path control valve structure for flushing toilet lid which can simplify the operation steps and improve the product quality and service life.

BACKGROUND

The intelligent toilet has many special functions, such as hip cleaning, Lower body cleaning, toilet seat warming, warm air drying and so on. The most convenient is that the intelligent toilet is initially used for medical treatment and elderly health care. The body cleaning function can effectively reduce the anal diseases of all people and bacterial infection of female lower body parts, greatly reducing the prevalence of gynecological diseases and anorectal diseases. The massage function with water potential at different intensities repeatedly acts on the washing parts being cleaned, so as to promote blood circulation and prevent related diseases, especially for constipation patients, which has the effect of promoting defecation.

Most of the functions of the above intelligent toilet are from the intelligent toilet lid, however, most of the intelligent toilet lids sold on the market are divided into two types, including:

The first type is to use of the electromagnetic valve and the directional-control valve, wherein the electromagnetic valve is connected in series in the cold water inlet water path to control the inlet water, and the directional-control valve is connected to the functional outlet water path after the cold water heating, so that the combination of electromagnetic valve and the directional-control valve can realize a structure with the functions of inlet water and outlet water. However, the use of electromagnetic valve in this structure has the disadvantages in high cost, short maintenance period, etc. In specific: 1. The high price of the electromagnetic valve on the market directly leads to the increase of the cost of the product in the manufacturing process. 2. The work of the electromagnetic valve requires power supply, and the setting of the electromagnetic valve is at the water inlet, so that the electromagnetic valve directly controls the hole of the toilet lid system without water pressure, it will cause the electromagnetic valve out of control, damage and other phenomena in long-term use, which will make the toilet lid system filled with water, even causing water leakage, electricity leakage and other phenomena. 3. Due to the limited service life of the electromagnetic valve itself, the maintenance period of the product will be shortened directly, so that the product needs frequent replacement of parts, resulting in high maintenance cost. 4. If the voltage is unstable or the power is cut off, the product cannot work.

The second type is to use mechanical pressure stabilizing valve and the directional-control valve, wherein the mechanical pressure stabilizing valve is connected to the cold water inlet water path to control the inlet water, and the directional-control valve is connected to the functional outlet water path after the cold water heating, so that the combination of the pressure stabilizing valve and the directional-control valve can realize a structure with the function of inlet water and outlet water, replacing the structure of the first electromagnetic valve and the directional-control valve, so as to solve the deficiency of the first structure to a certain degree. But the second structure releases water into the system of the toilet lid. Although it uses the pressure stabilizing valve to control the water pressure within a certain range, once the pressure stabilizing valve breaks down or is damaged, it will directly cause the toilet lid system to flush with large pressure water, so that the whole product cannot work normally.

Whether it is the combination control of electromagnetic valve and directional-control valve, or the structure control of stabilizing valve and directional-control valve, both of them have advantages and disadvantages. Therefore, it is necessary to conduct a deep research and design based on the characteristics of the above products and the advantages of the technical solution. thus, the present disclosure is produced.

SUMMARY

The problem solved by the disclosure is how to ensure that there is no water pressure in the unused toilet lid system and avoid the deficiencies caused by the electromagnetic valve at the same time.

In order to solve the above problems, a water path control valve structure for flushing toilet lid is provided by the present disclosure, which is divided into upper valve part and lower valve part, including a valve body, a linkage valve core and a sealing component, the sealing component is installed on the linkage valve core, the linkage valve core is arranged in a hollow cavity of the valve body and one end of the linkage valve core extends out of the valve body.

Wherein the linkage valve core includes an upper valve core and a lower valve core arranged coaxially, one end of the upper valve core extends out of the valve body, and the upper core and lower valve core are installed with a sealing member, respectively.

Further, the upper core and lower valve core are in form of an integrated valve core or a detachable connecting valve core.

Further, one end of the lower valve core abutted jointed with the upper valve core is a connecting end, and the connecting end of the lower valve core is provided with a plug-in groove, and a plug-in protrusion matched the plug-in groove is provided at an end of the upper valve core, so that the plug-in protrusion of the upper valve core is connected to the plug-in groove of the lower valve core to achieve a rotation linkage.

Further, the upper valve core is connected to the sealing member, the sealing member is a sealing gasket, and the sealing gasket is an arc-shaped gasket which is able to be connected to the upper valve core and is in linkage with the upper valve core, the sealing gasket rotates with a rotation of the upper valve core to aligned or misaligned to a port on the valve body, so as to realize a control of a connection or disconnection of a corresponding water path; a lower end of the lower valve core is connected by the other sealing member, the sealing member is a sealing disc group, the sealing disc group includes two sealing discs that cooperate with each other to achieve selective sealing.

Further, wherein the two sealing discs are an upper sealing disc and a lower sealing disc, respectively.

Wherein the lower sealing disc, mounted in an interior of the valve body, and two water through holes are provided on the lower sealing disc;

the upper sealing disc, connected to the lower valve core and in linkage with the lower valve core, one water through hole is provided on the upper water through hole;

the upper sealing disc rotates with the lower valve core, and then drives the water through hole on the upper sealing disc to aligned or misaligned to any water through hole on the lower sealing disc, so as to control the connection or the disconnection of the corresponding water path.

Further, the upper valve part is a directional-control valve part, the lower valve part is a mechanical on-off valve part, the upper valve core is a directional-control valve core, and the lower valve core is a on-off valve core; further, the valve body is provided with a hot water inlet, a first outlet and a second outlet corresponding to the upper valve core, and the valve body is provided with a cold water inlet and a cold water outlet corresponding to the lower valve core.

Further, the hot water inlet is respectively communicated with the first water outlet and the second water outlet to form a first water outlet path and a second water outlet path; and the directional-control valve core equipped with a sealing member is rotated to control the connection or disconnection of the hot water inlet, the first water outlet and the second water outlet; the cold water inlet is communicated with the cold water outlet to form a cold water path, and the on-off valve core equipped with the other sealing member is rotated by the directional-control valve core to control the connection or disconnection of the cold water path.

Further, the upper valve part is a mechanical on-off valve part, the lower valve part is a directional-control valve part, the upper valve core is a on-off valve core, and the lower valve core is a directional-control valve core; further, the valve body is provided with a cold water inlet and a cold water outlet corresponding to the upper valve core, and the valve body is provided with a hot water inlet, a first outlet and a second outlet corresponding to the lower valve core.

Further, the cold water inlet is communicated with the cold water outlet to form a cold water path, and the on-off valve core equipped with the sealing member is rotated to control the connection or disconnection of the cold water path; the hot water inlet is respectively communicated with the first water outlet and the second water outlet to form a first water outlet path and a second water outlet path, and the directional-control valve core equipped with the other sealing member is rotated by the on-off valve core to control the connection or disconnection of the hot water inlet and the first water outlet and the connection or disconnection of the hot water inlet and the second water outlet, respectively.

Further, the first water outlet is a hip washing water outlet and the second water outlet is a female washing water outlet, or the first water outlet is the female washing water outlet and the second water outlet is the hip washing water outlet.

Compared with the prior art, the advantages of the present disclosure are shown as below:

The present disclosure applies the combination of the mechanical on-off valve and the directional-control valve, the mechanical on-off valve is used to cut off the high water pressure water path at the front end, so as to ensure that there is no water pressure in the water path system of the toilet lid, so as to ensure that the product maintains no pressure in the system in the unused state, and prolong the service life of the product.

The present disclosure integrates the mechanical on-off valve and the directional-control valve into an integral valve structure, to integrate the two water paths in the prior art, so as to realize the operation of the two valves at the same time, achieving the two purposes of water inlet and function switching, so that the purposes of convenient operation and simplicity are achieved.

The on-off valve and the directional-control valve in the present disclosure can adopt the mechanical valve structure, thereby reducing the electric control part in the prior art. Therefore, the present disclosure has the advantages in less electric control part, simple operation, reliable use, safety, sustainable heating, etc.

DETAILED DESCRIPTION OF THE EMBODIMENTS

In the prior art, there is a toilet lid water path control system that uses a electromagnetic valve and a directional-control valve to realize the control of the water inlet and function reversal of the toilet lid system. Although the structure can intercept the water pressure to the water inlet, the installation of the electromagnetic valve has disadvantages such as high cost, short maintenance period, and high failure rate. Another type uses the mechanical pressure stabilizing valve and the directional-control valve to realize the control of water inlet and functional reversal of the toilet lid system. The structure can only adjust the water pressure at the water inlet to a certain range, but it cannot keep the system in a state without water pressure. When the pressure stabilizing valve fails or is damaged, it directly causes the product have to be repaired, which can not be used normally.

In view of the above technical problems, the inventor has continuously researched valve core to find the technical solution of a water path control valve structure for flushing toilet lid, which is divided into upper part and lower valve part, including a valve body, a linkage valve core and a sealing component. The sealing component is installed on the linkage valve core, and the linkage valve core is arranged in a hollow cavity of the valve body and one end of the linkage valve core extends out of the valve body. Wherein, the linkage valve core includes a upper valve core and a lower valve core arranged coaxially, one end of the upper valve core extends out of the valve body, and the upper core and lower valve core are installed with the sealing member, respectively.

In the technical solution of the present disclosure, it includes two linked valve core structures, so that the two valve core structures can cooperate with each other to achieve the purpose of controlling the two valve cores at one time, realizing the purpose of reasonable structure and convenient operation. In addition, the two valve cores can be on-off valve core or directional-control valve core respectively, so as to ensure that the water flow is trapped outside the water inlet, and the mechanical structure can also be used to ensure the service life and safety of the product, thereby reducing the shortcomings brought by the electromagnetic valve such as high cost and short service life, thereby solving the technical problems existing in the prior art.

Figure 1:
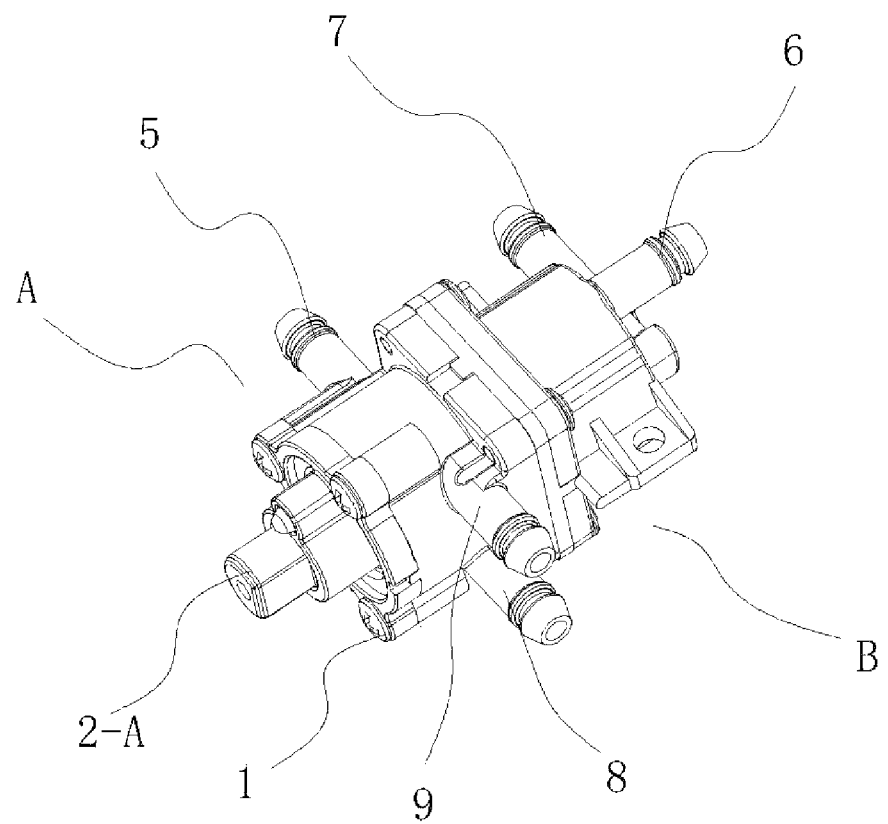
FIG. 1 is a perspective view showing the structure in embodiment 1 of the present disclosure.
Figure 15:
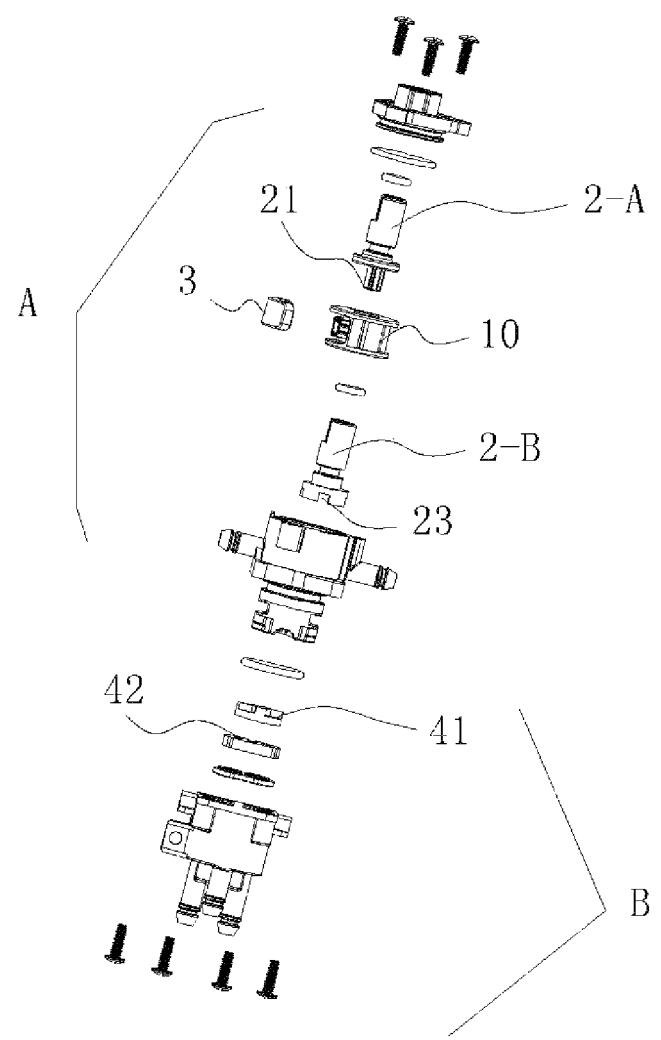
FIG. 15 is a structural exploded view in embodiment 2 of the present disclosure.

The specific solution in the above structure is as follows:

As shown in FIG. 1 and FIG. 15, the technical solution of a water path control valve structure for flushing toilet lid, which is divided into upper part A and lower valve part B, including a valve body 1, a linkage valve core and a sealing component, the sealing component is installed on the linkage valve core, the linkage valve core is arranged in a hollow cavity of the valve body 1 and one end of the linkage valve core extends out of the valve body, wherein:

The linkage valve core includes an upper valve core 2-A and a lower valve core 2-B arranged coaxially, one end of the upper valve core 2-A extends out of the valve body 1, and the upper core 2-A and lower valve core 2-B are installed with the sealing member, respectively.

In the specific processing and production process, the upper and lower valve cores 2-A and 2-B are connected in one, or the upper and lower valve cores 2-A and 2-B are two valve cores which are coaxial and can be detachable.

Figure 2:
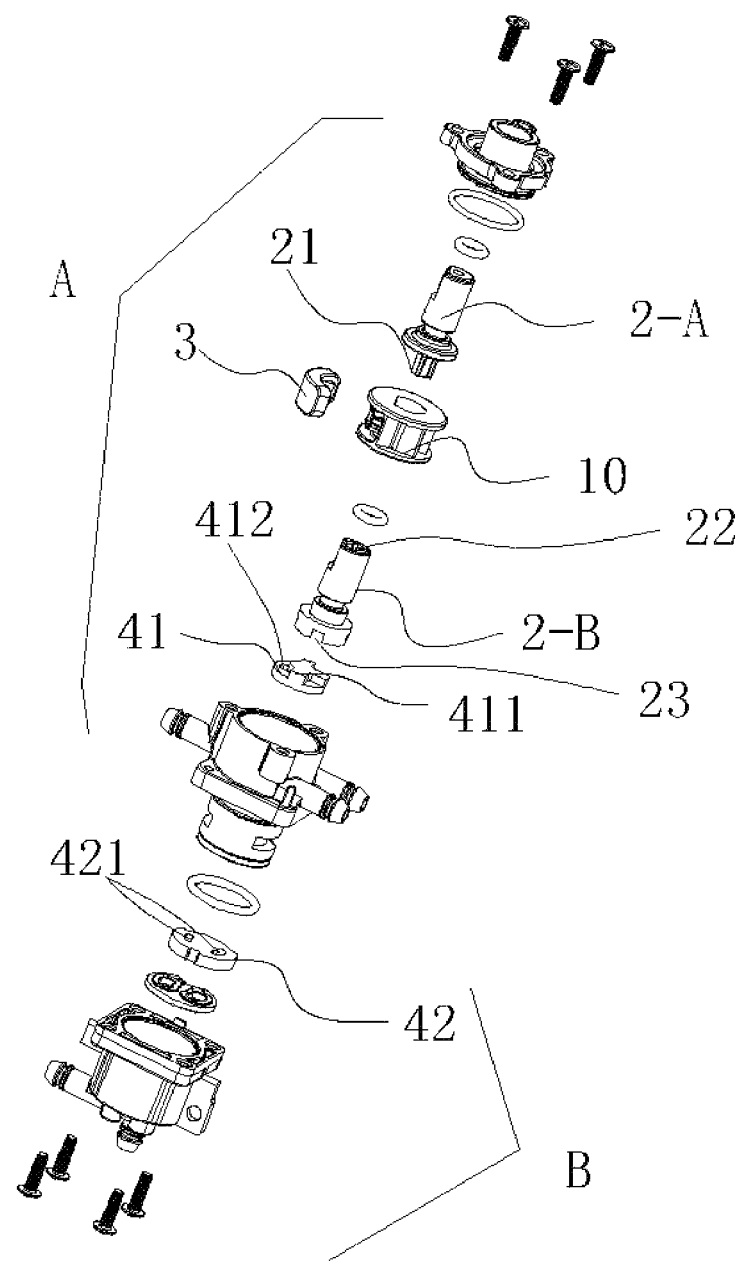
FIG. 2 is a structural exploded view in embodiment 1 of the present disclosure.
Figure 7:
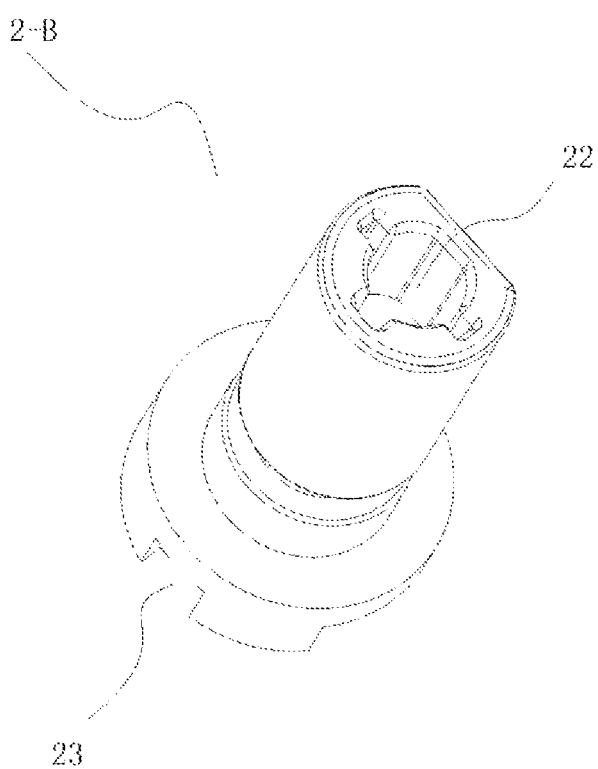
FIG. 7 is a first schematic diagram showing the structure of the lower valve core in embodiment 1 of the present disclosure.
Figure 16:
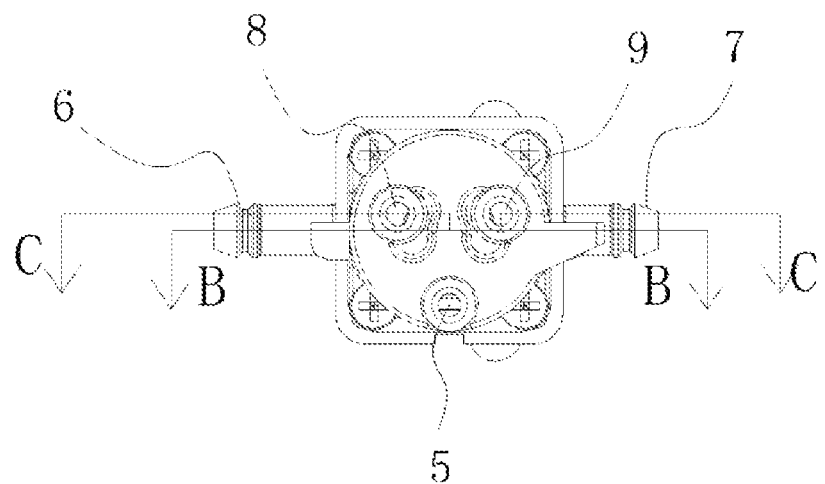
FIG. 16 is a side view showing the structure in embodiment 2 of the present disclosure.
Figure 17:
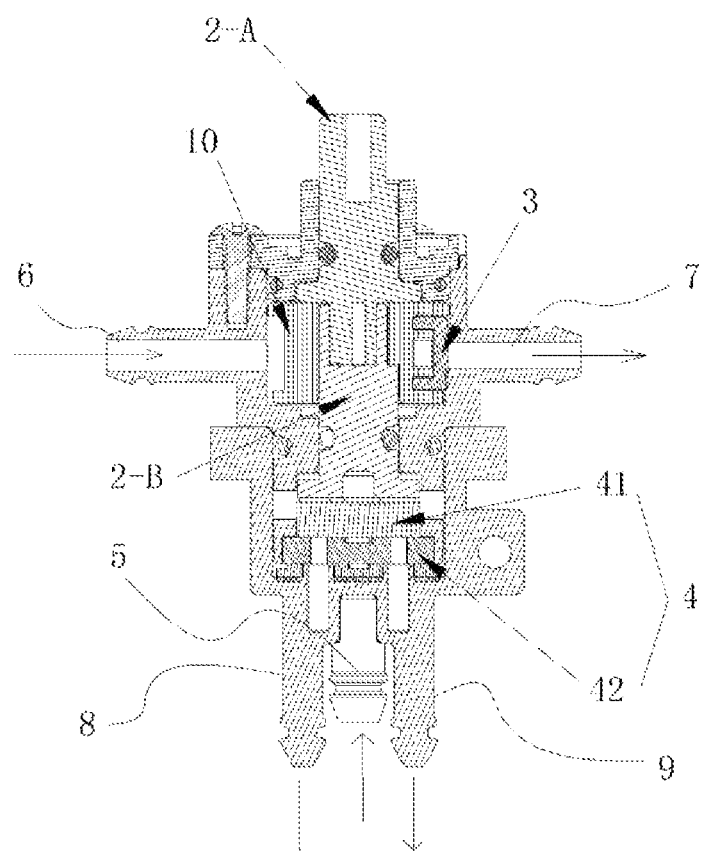
FIG. 17 is the structural diagram taken along B-B in FIG. 16.
Figure 18:
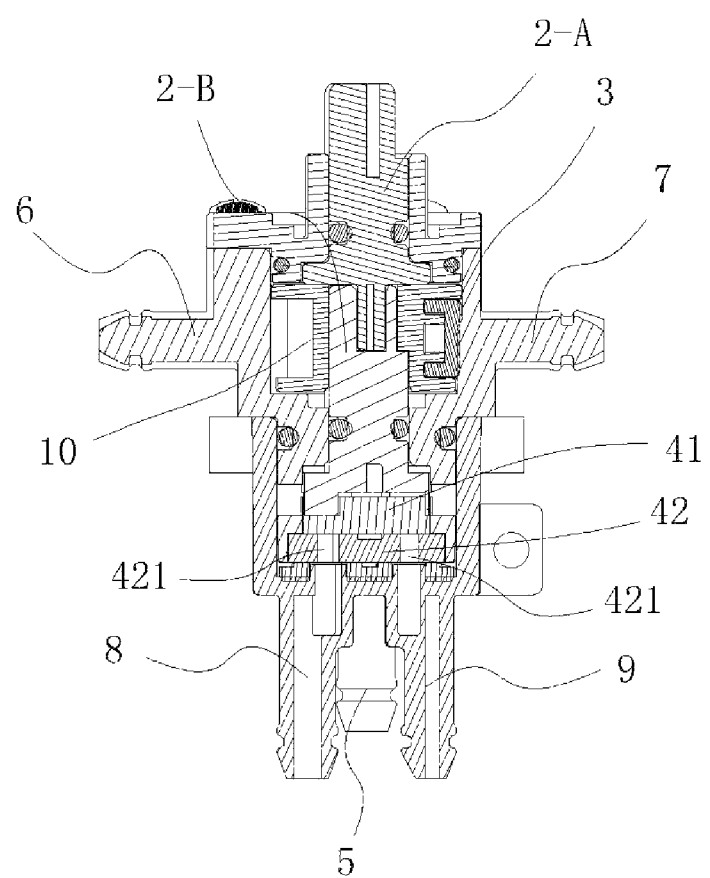
FIG. 18 is the structural diagram taken along C-C in FIG. 16.

Preferably, as shown in FIG. 2 and FIG. 16, the upper and lower valve cores 2-A and 2-B are two valve cores that are detachable connected and in coaxial setting. Specifically, one end of the lower valve core 2-B is connected to the upper valve core 2-A, the connecting end of the lower valve core 2-B is provided with a plug-in groove (as shown in FIG. 7), and a plug-in protrusion 21 matched the plug-in groove is provided at the end of the upper valve core 2-A, so that the plug-in protrusion 21 of the upper valve core 2-A is connected to the plug-in groove 22 of the lower valve core 2-B to achieve a rotation linkage.

Figure 5:
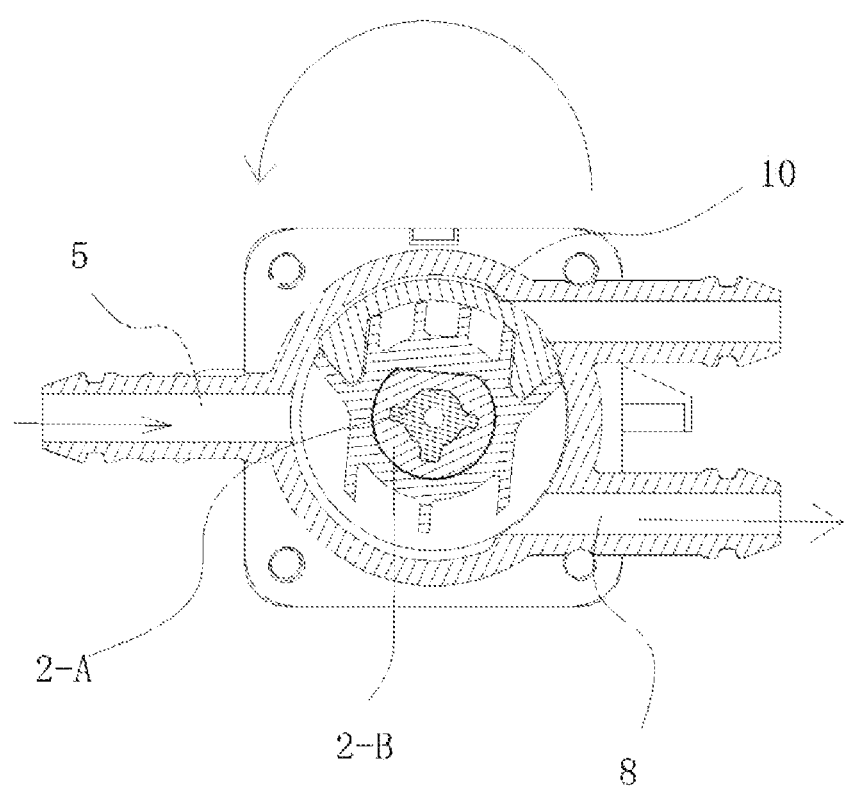
FIG. 5 is a structural schematic diagram of the connection state in anticlockwise rotation of the hip washing water outlet in the embodiment 1 of the present disclosure.
Figure 6:
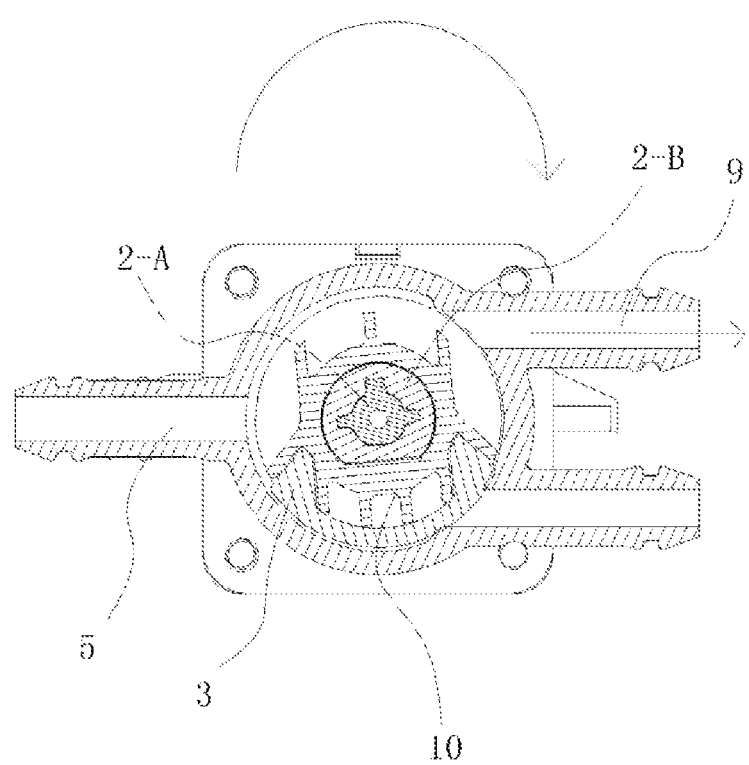
FIG. 6 is a structural schematic diagram of the connection state in the clockwise rotation of the female washing water outlet in embodiment 1 of the present disclosure.

As shown in FIG. 2, FIG. 3, FIG. 16 and FIG. 17, the upper valve core 2-A is connected with the sealing member, which is a sealing gasket 3. The sealing gasket 3 is an arc gasket which can be connected to the upper valve core 2-A and linked with the upper valve core. The sealing gasket 3 rotates with the rotation of the upper valve core 2-A, so as to aligned or misaligned with the port on the valve body 1, so as to realize a control of a connection or disconnection of a corresponding water path (as shown in FIG. 5 and FIG. 6).

As shown in FIG. 1 to FIG. 13, the lower end of the lower valve core 2-B is connected by the other seal, which is a sealing disc group 4, which includes two sealing discs matched to realize selective sealing. Specifically: the two sealing discs are an upper sealing disc 41 and a lower sealing disc 42, respectively.

Wherein the lower sealing disc 42, mounted in an interior of the valve body 1, and two water through holes 421 are provided on the lower sealing disc.

Figure 8:
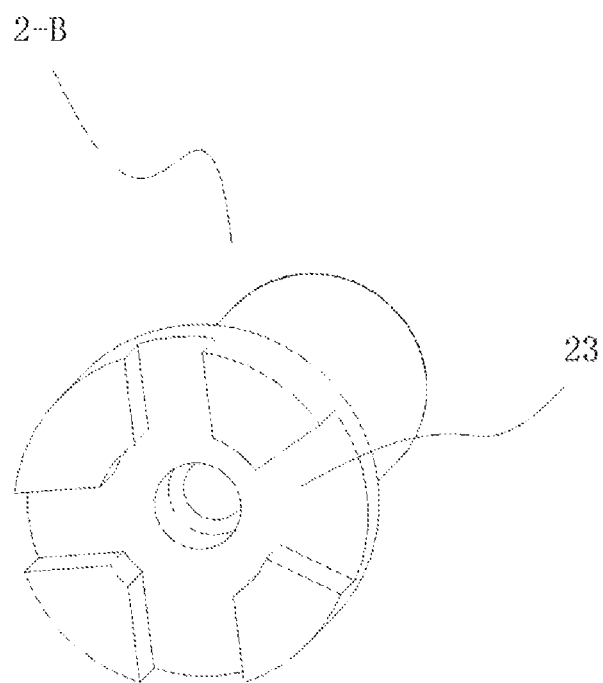
FIG. 8 is a second schematic diagram showing the structure of the lower valve core in embodiment 1 of the present disclosure.
Figure 9:
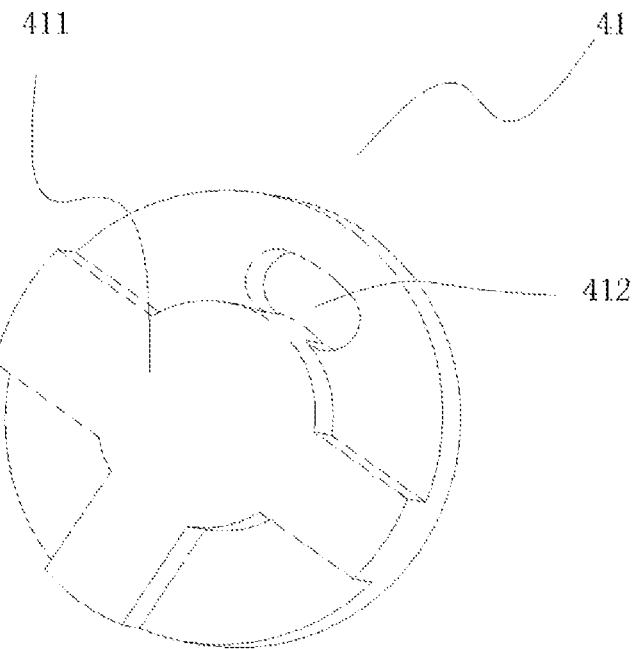
FIG. 9 is a schematic diagram showing the structure of the upper sealing disc in the sealing disc group in embodiment 1 of the present disclosure.
Figure 10:
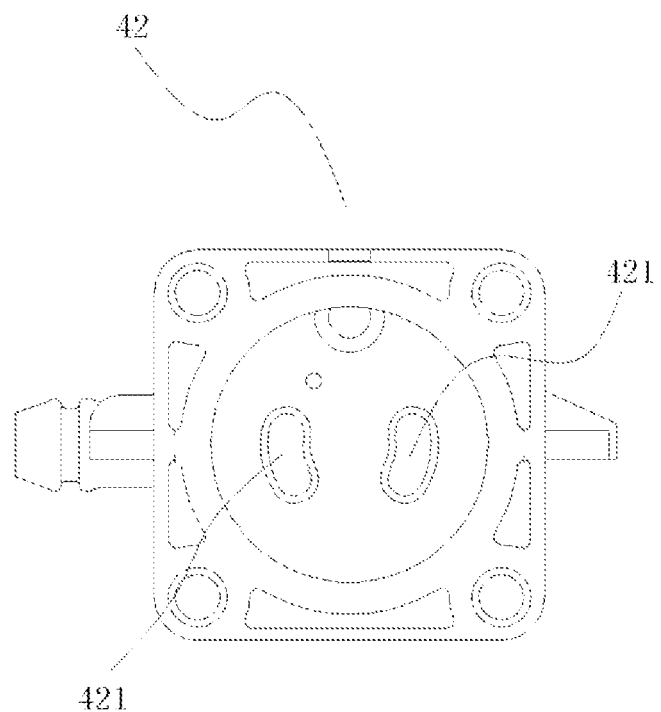
FIG. 10 is a schematic diagram showing the structure of the lower sealing disc of the sealing disc group in embodiment 1 of the present disclosure.

The upper sealing disc 41, connected to the plug-in groove 23 of the lower valve core 2-B through a cross-shaped buckle 411 and in linkage with the lower valve core (as shown in FIG. 8 and FIG. 9), one water through hole 412 is provided on the upper sealing disc 41.

The upper sealing disc 41 rotates with the lower valve core 2-B, and then drives the water through hole 412 on the upper sealing disc 41 to aligned or misaligned to any water through hole 421 on the lower sealing disc 42, so as to control the connection or the disconnection of the corresponding water path.

The specific embodiments of the upper and lower valve cores in the present disclosure will be described in detail in combination with the attached drawings.

Embodiment 1

Figure 3:
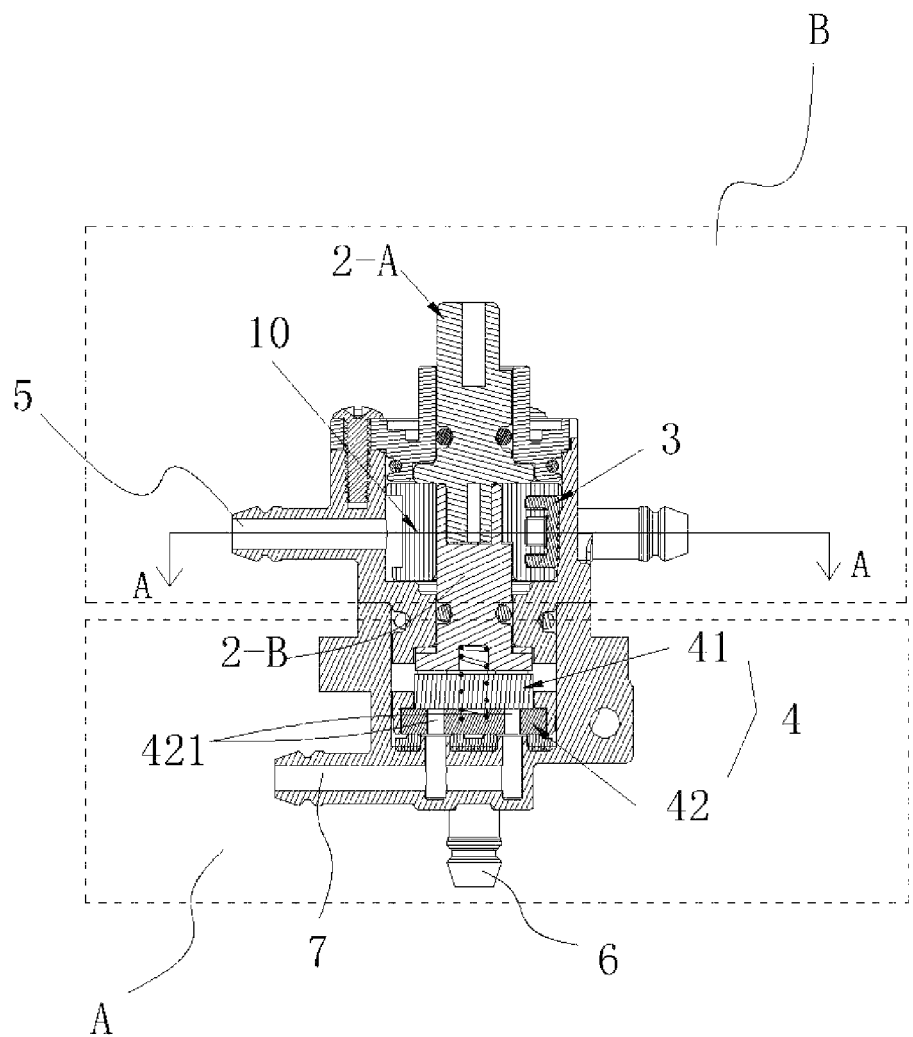
FIG. 3 is a structural sectional view in embodiment 1 of the present disclosure.
Figure 4:
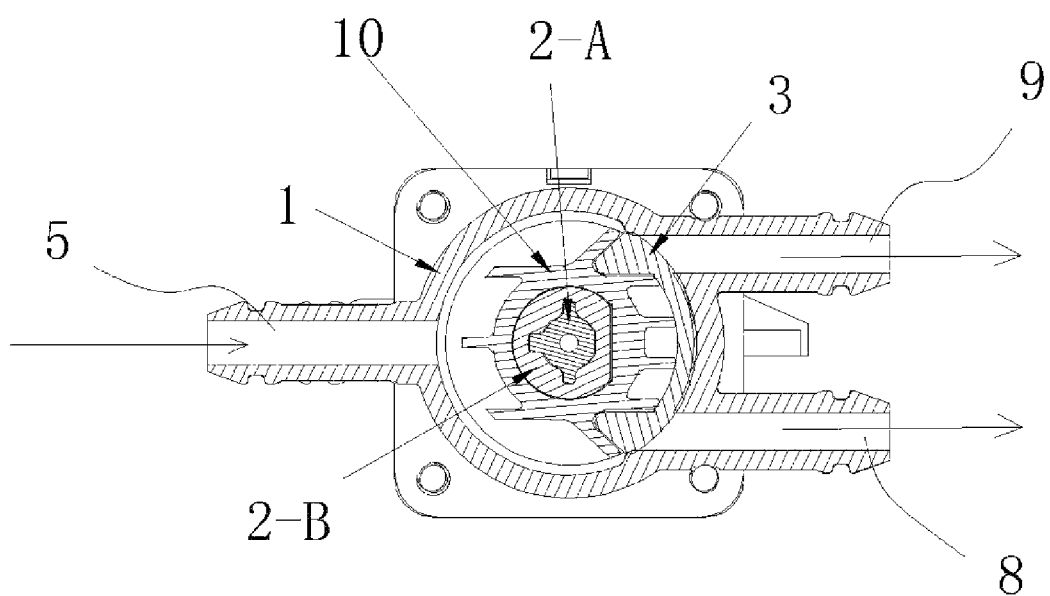
FIG. 4 is a sectional view taken along A-A in FIG. 3.

As shown in FIG. 2 to FIG. 3, in the present embodiment, the linkage valve core is a detachable structure with upper and lower valve cores 2-A and 2-B in a plug-in connection.

As shown in FIG. 1 to FIG. 2, the upper valve part A is a directional-control valve part, the lower valve part B is a mechanical on-off valve part, the upper valve core is a directional-control valve core 2-A, and the lower valve core 2-B is a on-off valve core. The upper valve core 2-A and the lower valve core 2-B are in a plug-in connection to form a linkage valve core, so that the structure of the directional-control valve A and the mechanical on-off valve B are incorporated into one, forming an integrated control valve structure.

As shown in FIG. 3 to FIG. 13, the valve body 1 is provided with a hot water inlet 5, a first water outlet and a second water outlet corresponding to the upper valve core 2-A, and the valve body 1 is provided with a cold water inlet 6 and a cold water outlet 7 corresponding to the lower valve core 2-B, so that the valve body 1 is matched with the directional-control valve core 2-A and the corresponding sealing member 3 to form a directional-control valve structure. Specifically: The hot water inlet 5 is respectively communicated with the first water outlet and the second water outlet to form a first water outlet path and a second water outlet path. And the directional-control valve core 2-A equipped with a sealing member 3 is rotated to control the connection or the disconnection of the hot water inlet, the first water outlet and the second water outlet, respectively. The cold water inlet 6 is communicated with the cold water outlet 7 to form a cold water path, and the on-off valve core 2-B equipped with the other sealing member 4 is rotated by the directional-control valve core 2-A to control the connection or disconnection of the cold water path.

As shown in FIG. 3 to FIG. 13, the first water outlet described above is a hip washing water outlet and the second water outlet is a female washing water outlet, or the first water outlet is the female washing water outlet and the second water outlet is the hip washing water outlet.

As shown in FIG. 3 to FIG. 13, in the present embodiment, the first water outlet described above is a hip washing water outlet 8, and the second water outlet is the female washing water outlet 9. Therefore, the first water outlet path is a hip washing water outlet water path, the second water outlet path is the female washing water outlet water path.

The directional-control valve core 2-A and the on-off valve core 2-B are in plug-in connection, and a rotating ring 10 is sleeved at the position where they are connected. The rotating ring is provided with a limited slot, and the arc-shaped gasket 3 is installed at the limited slot of the rotating ring, and the external force is used to rotate the directional-control valve core 2-A to realize the rotation, so as to realize the control of the hip washing water outlet water path and the female washing water outlet water path. The rotation of the directional-control valve core 2-A drives the rotation of the on-off valve core 2-B, thereby, the on-off valve core 2-B drives the sealing disc group 4 for sealing the end face, to control the cold water path.

Figure 11:
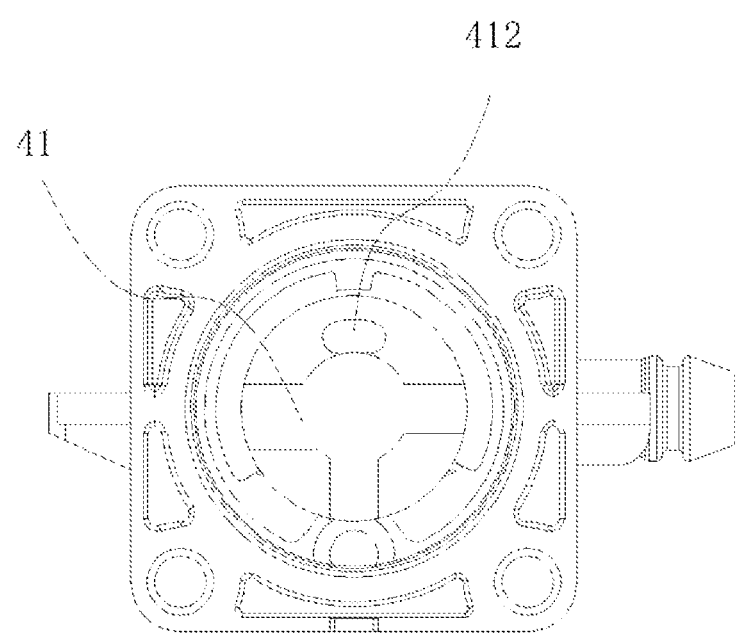
FIG. 11 is a schematic diagram showing the structure that water through holes on the upper sealing disc and the lower sealing disc of the sealing disc group are misaligned to disconnect the cold water path.
Figure 12:
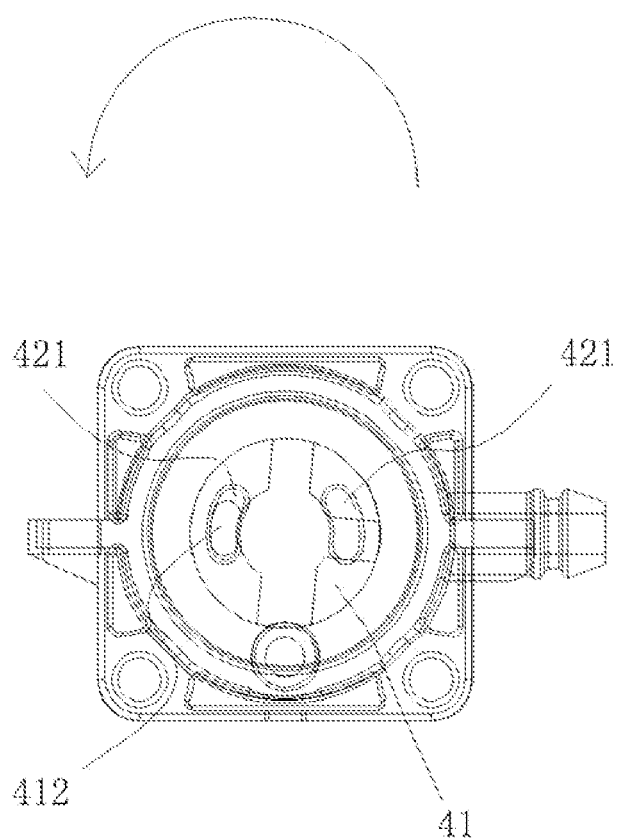
FIG. 12 is a structural schematic diagram of the connection state in the anticlockwise rotation of the cold water path in embodiment 1 of the present disclosure.
Figure 13:
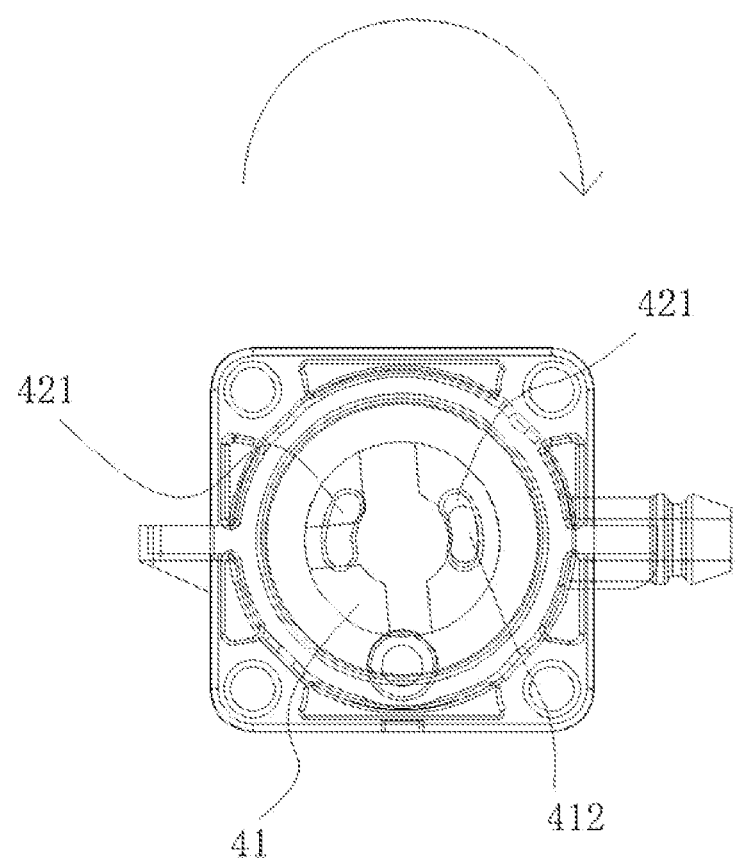
FIG. 13 is a structural schematic diagram of the connection state in the clockwise rotation of the cold water path in embodiment 1 of the present disclosure.

Specifically: As shown in FIG. 11, when the directional-control valve core 2-A is to drive the on-off valve core 2-B to the close the cold water path, the water in the whole system will be intercepted, so as to keep no water in the toilet lid system, which is also a normal state when the toilet lid system in the unused state.

As shown in FIG. 3 to FIG. 13, when the directional-control valve core 2-A is rotated anticlockwise, the directional-control valve core 2-A drives the on-off valve core 2-B and the sealing disc group 4 in sequence, wherein the upper sealing disc 41 in the sealing disc group 4 rotates anticlockwise, so that the water through hole 412 of the upper sealing disc 41 is communicated with the water through hole 421 of the lower sealing disc 42, so as to realize the connection of the cold water path. After the connection of the cold water path, the cold water enters into the heating pipe for realizing the electric heating, and then enters from the hot water inlet 5. By the cooperation of the directional-control valve 2-A and the sealing disc gasket 3, so as to realize the communication of the hot water inlet 5 and the hip washing water outlet 8, so that the hip washing water outlet water path is separately connected.

As shown in FIG. 3 to FIG. 13, when the extended directional-control valve core 2-A is rotated clockwise, the directional-control valve core 2-A is to drive the on-off valve core 2-B and the sealing disc group 4 in sequence, wherein the upper sealing disc 41 in the sealing disc group 4 rotates clockwise, so that the water through hole 412 of the upper sealing disc 41 is communicated with the water through hole 421 of the lower sealing disc 42, so as to realize the connection of the cold water path. After the connection of the cold water path, the cold water enters into the heating pipe for realizing the electric heating, and then enters from the hot water inlet 5. By the cooperation of the directional-control valve 2-A and the sealing disc gasket 3, so as to realize the communication of the hot water inlet 5 and the female washing water outlet 9, so that the female washing water outlet water path is separately connected.

Embodiment 2

Figure 14:
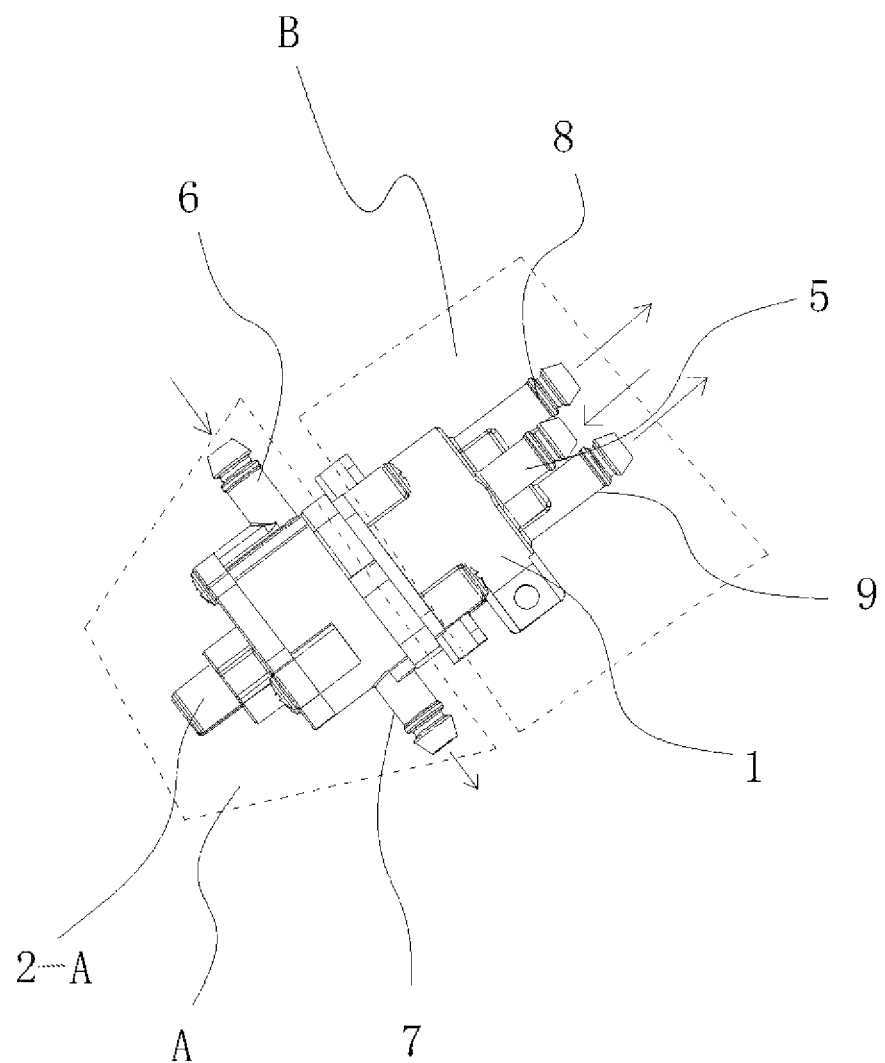
FIG. 14 is a perspective view showing the structure in embodiment 2 of the present disclosure.

As shown in FIG. 14 to FIG. 16, in the present embodiment, the linkage valve core is a detachable structure by using of a upper valve core 2-A and a lower valve core and 2-B in a plug-in connection.

As shown in FIG. 14 to FIG. 18, the upper valve part A is a mechanical on-off valve part, the lower valve part B is a directional-control valve part, and the upper valve core 2-A is a on-off valve core, and the lower valve core 2-B is a directional-control valve core. The upper valve core 2-A and the lower valve core 2-B are in the plug-in connection to form the linkage valve core, so as to realize to integrate the structure of the mechanical on-off valve and the directional-control valve into one, forming an integrated control valve structure.

Referring to the structure as shown in FIG. 14 to FIG. 18 and the structure in embodiment 1, the valve body 1 is provided with a cold water inlet 6 and a cold water outlet 7 corresponding to the upper valve core 2-A, and the valve body 1 is provided with a hot water inlet 5, the first outlet and the second outlet corresponding to the lower valve core 2-B. Specifically: The cold water inlet 6 is communicated with the cold water outlet 7 to form a cold water path, and the on-off valve core 2-A equipped with the sealing member 3 is rotated to control the connection or disconnection of the cold water path. The hot water inlet 5 is respectively communicated with the first water outlet and the second water outlet to form the first water outlet path and the second water outlet path. And the directional-control valve core equipped with the other sealing member 4 is rotated by the on-off valve core 2-A to control the connection or disconnection of the hot water inlet and the first water outlet and the connection or disconnection of the hot water inlet and the second water outlet, respectively.

As shown in FIG. 14 to FIG. 18, the first water outlet described above is a hip washing water outlet and the second water outlet is a female washing water outlet, or the first water outlet is the female washing water outlet and the second water outlet is the hip washing water outlet.

As shown in FIG. 14 to FIG. 18 and refer to the structure in embodiment 1, in the present embodiment, the first water outlet 8 is a hip washing water outlet, the second water outlet 9 is the female washing water outlet. And the first water outlet path is a hip washing water outlet water path, the second water outlet path is the female washing water outlet water path.

The on-off valve core 2-A and the directional-control valve core 2-B are in plug-in connection, and a rotating ring 10 is sleeved at the position where they are connected. The rotating ring is provided with a limited slot, and the arc-shaped gasket 3 is installed at the limited slot of the rotating ring, and the external force is used to rotate the on-off valve core 2-A to realize the rotation, so as to realize the control of the cold water path. The rotation of the on-off valve core 2-A drives the rotation of the directional-control valve core 2-B, thereby, the directional-control valve 2-B drives the sealing disc group 4 for sealing the end face, to control the hip washing water outlet water path and the female washing water outlet water path.

Specifically: when the on-off valve core 2-A is rotated to close the cold water path, the water in the whole system will be intercepted, so as to keep no water in the toilet lid system, which is also a normal state when the toilet lid system in the unused state.

When the on-off valve core 2-A is rotated anticlockwise, the on-off valve core 2-A drives the directional-control valve core 2-B and the sealing disc group 4 in sequence, wherein the rotation of the sealing gasket 3 realizes the connection of the cold water inlet 6 and the cold water outlet 7, so as to realize the connection of the cold water path. After the connection of the cold water path, the cold water enters into the heating pipe for realizing the electric heating, and then enters from the hot water inlet. By the linkage of the directional-control valve 2-B and the sealing disc group 4, the upper sealing disc 41 in the sealing disc group 4 is driven to rotate, so that the water through hole 412 of the upper sealing disc 41 is communicated with the first water through hole 421 of the lower sealing disc 42, and then the water through hole 412 of the lower sealing disc 4 is communicated with the hip washing water outlet 8 to realize the communication of the hot water inlet 5 and the hip washing water outlet 8, so that the hip washing water outlet water path is separately connected, and the female washing water outlet water path is intercepted.

When the extended on-off valve core 2-A is rotated clockwise, the on-off valve core 2-A drives the directional-control valve core 2-B and the sealing disc group 4 in sequence, wherein the rotation of the sealing gasket 3 realizes the communication of the cold water inlet 6 and the cold water outlet 7, so that the connection of the cold water path is realized. After the connection of the cold water path, the cold water enters into the heating pipe for realizing the electric heating, and then the heated water enters from the hot water inlet 5. By the linkage of the directional-control valve core 2-B and the sealing disc group 4, the upper sealing disc 41 in the sealing disc group 4 is driven to rotate, so that the water through hole 412 of the upper sealing disc 41 is communicated with another water through hole 421 of the lower sealing disc 42, and then the other water through hole 421 of the lower sealing disc 42 is communicated with the female washing water outlet 9, so as to realize the communication of the hot water inlet 2 and the female washing water outlet 9, so that the female washing water outlet water path is separately connected, and the hip washing water outlet water path is intercepted.

The above structure and the structure described in embodiment 1 and 2 overcome the deficiencies of the prior art, and provide a structure with less electric control part, which is easy to operation and has a reliable intelligent flushing toilet lid structure. At the same time, the mechanical on-off valve cooperated with the directional-control valve is used to block the front high water pressure water path and the structure configured to switch the water path at the rear position after the treatment by the water treatment device. Namely, the on-off valve and the directional-control valve are coaxially rotated, the on-off valve is operated and the model of the directional-control valve is switched at the same time. By using of the mechanical principle, the structure is simpler, more reliable and safe in function.

Although the present disclosure is disclosed as above in the preferred embodiment, it is not a limitation to the present disclosure. There are changes and modifications can be made by any person skilled in the art without departing from the spirit and scope of the present disclosure. Therefore, the scope of the present disclosure shall be subject to the scope defined in the claims.

What is claimed is:

1. A water path control valve structure for flushing toilet lid, which is divided into a upper valve part and a lower valve part, comprising a valve body, a linkage valve core and a sealing component, the sealing component is installed on the linkage valve core, the linkage valve core is arranged in a hollow cavity of the valve body and one end of the linkage valve core extends out of the valve body,
   wherein the linkage valve core comprises an upper valve core and a lower valve core arranged coaxially, one end of the upper valve core extends out of the valve body, and the upper valve core and the lower valve core are installed with a sealing member, respectively;
   wherein the upper valve core is connected to the sealing member, the sealing member is a sealing gasket, and the sealing gasket is an arc-shaped gasket which is able to be connected to the upper valve core and is in linkage with the upper valve core, the sealing gasket rotates with a rotation of the upper valve core to aligned or misaligned to a port on the valve body, so as to realize a control of a connection or a disconnection of a corresponding water path; a lower end of the lower valve core is connected by an other sealing member, the other sealing member is a sealing disc group, the sealing disc group comprises two sealing discs that cooperate with each other to achieve selective sealing.

2. The water path control valve structure for flushing toilet lid according to claim 1, wherein the upper valve core and the lower valve core are in form of an integrated valve core or a detachable connecting valve core.

3. The water path control valve structure for flushing toilet lid according to claim 2, wherein one end of the lower valve core abutted jointed with the upper valve core is a connecting end, and the connecting end of the lower valve core is provided with a plug-in groove, and a plug-in protrusion matched the plug-in groove is provided at an end of the upper valve core, so that the plug-in protrusion of the upper valve core is connected to the plug-in groove of the lower valve core to achieve a rotation linkage.

4. The water path control valve structure for flushing toilet lid according to claim 3, wherein the upper valve core is connected to the sealing member, the sealing member is a sealing gasket, and the sealing gasket is an arc-shaped gasket which is able to be connected to the upper valve core and is in linkage with the upper valve core, the sealing gasket rotates with a rotation of the upper valve core to aligned or misaligned to a port on the valve body, so as to realize a control of a connection or disconnection of a corresponding water path; a lower end of the lower valve core is connected by an other sealing member, the other sealing member is a sealing disc group, the sealing disc group comprises two sealing discs that cooperate with each other to achieve selective sealing.

5. The water path control valve structure for flushing toilet lid according to claim 4, wherein the two sealing discs are an upper sealing disc and a lower sealing disc, respectively,
   wherein the lower sealing disc, mounted in an interior of the valve body, and two water through holes are provided on the lower sealing disc;
   the upper sealing disc, connected to the lower valve core and in linkage with the lower valve core, one water through hole is provided on the upper sealing disc;
   the upper sealing disc rotates with the lower valve core, and then drives the water through hole on the upper sealing disc to aligned or misaligned to any water through hole on the lower sealing disc, so as to control the connection or the disconnection of the corresponding water path.

6. The water path control valve structure for flushing toilet lid according to claim 1, wherein the two sealing discs are an upper sealing disc and a lower sealing disc, respectively, wherein the lower sealing disc, mounted in an interior of the valve body, and two water through holes are provided on the lower sealing disc;

the upper sealing disc, connected to the lower valve core and in linkage with the lower valve core, one water through hole is provided on the upper sealing disc;

the upper sealing disc rotates with the lower valve core, and then drives the water through hole on the upper sealing disc to aligned or misaligned to any water through hole on the lower sealing disc, so as to control the connection or the disconnection of the corresponding water path.

7. The water path control valve structure for flushing toilet lid according to claim 1, wherein the upper valve part is a directional-control valve part, the lower valve part is a mechanical on-off valve part, the upper valve core is a directional-control valve core, and the lower valve core is a on-off valve core; further, the valve body is provided with a hot water inlet, a first outlet and a second outlet corresponding to the upper valve core, and the valve body is provided with a cold water inlet and a cold water outlet corresponding to the lower valve core.

8. The water path control valve structure for flushing toilet lid according to claim 7, wherein the hot water inlet is respectively communicated with the first water outlet and the second water outlet to form a first water outlet path and a second water outlet path; the directional-control valve core equipped with the sealing member is rotated to control a connection or a disconnection of the hot water inlet and the first water outlet, and a connection or a disconnection of the hot water inlet and the second water outlet, respectively; the cold water inlet is communicated with the cold water outlet to form a cold water path, and the on-off valve core equipped with the other sealing member is rotated by the directional-control valve core to control a connection or a disconnection of the cold water path.

9. The water path control valve structure for flushing toilet lid according to claim 8, wherein the first water outlet is a hip washing water outlet and the second water outlet is a female washing water outlet, or the first water outlet is the female washing water outlet and the second water outlet is the hip washing water outlet.

10. The water path control valve structure for flushing toilet lid according to claim 1, wherein the upper valve part is a mechanical on-off valve part, the lower valve part is a directional-control valve part, the upper valve core is a on-off valve core, and the lower valve core is a directional-control valve core; further, the valve body is provided with a cold water inlet and a cold water outlet corresponding to the upper valve core, and the valve body is provided with a hot water inlet, a first outlet and a second outlet corresponding to the lower valve core.

11. The water path control valve structure for flushing toilet lid according to claim 10, wherein the cold water inlet is communicated with the cold water outlet to form a cold water path, and the on-off valve core equipped with the sealing member is rotated to control a connection or a disconnection of the cold water path; the hot water inlet is respectively communicated with the first water outlet and the second water outlet to form a first water outlet path and a second water outlet path, and the directional-control valve core equipped with the other sealing member is rotated by the on-off valve core to control a connection or a disconnection of the hot water inlet and the first water outlet and a connection or a disconnection of the hot water inlet and the second water outlet, respectively.

12. The water path control valve structure for flushing toilet lid according to claim 11, wherein the first water outlet is a hip washing water outlet and the second water outlet is a female washing water outlet, or the first water outlet is the female washing water outlet and the second water outlet is the hip washing water outlet.

\* \* \* \* \*